United States Patent
Yacoub et al.

(10) Patent No.: US 7,349,527 B2
(45) Date of Patent: Mar. 25, 2008

(54) SYSTEM AND METHOD FOR EXTRACTING DEMOGRAPHIC INFORMATION

(75) Inventors: Sherif Yacoub, Sant Cugat del Valles (ES); Steven J. Simske, Fort Collins, CO (US); Xiaofan Lin, San Jose, CA (US); Francois Vincent, Corenc (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 10/769,137

(22) Filed: Jan. 30, 2004

(65) Prior Publication Data
US 2005/0169441 A1 Aug. 4, 2005

(51) Int. Cl.
*H04M 1/64* (2006.01)
(52) U.S. Cl. ................. 379/88.11; 379/88.18; 379/265.13; 704/275; 726/2
(58) Field of Classification Search ............ 379/88.18, 379/88.16, 88.02, 88.11, 265.13; 704/275; 726/2
See application file for complete search history.

(56) References Cited

U.S. PATENT DOCUMENTS 7,231,657 B2 * 6/2007 Honarvar et al. ............. 726/2

2002/0046030 A1 4/2002 Haritsa et al.
2002/0095295 A1 * 7/2002 Cohen et al. ............... 704/275
2002/0184002 A1 12/2002 Galli

FOREIGN PATENT DOCUMENTS

EP 1076329 2/2001

\* cited by examiner

*Primary Examiner*—Gerald Gauthier

(57) ABSTRACT

A system and method for extracting demographic information from a contact is disclosed. The method discloses: initiating a dialog between a contact and a call handling system; selecting a set of demographic characteristics; assigning a set of acoustic confidence scores; assigning a set of substantive confidence scores; combining the acoustic and substantive confidence scores; and tailoring information presented to the contact using the set of combined confidence scores. The system discloses: an Interactive Voice Response module for initiating a dialog between a contact and a call handling system, and selecting a set of demographic characteristics; an acoustic classifier for assigning a set of acoustic confidence scores; a substantive classifier for assigning a set of substantive confidence scores; and a data combiner for combining the acoustic and substantive confidence scores. The Interactive Voice Response module also tailors information presented to the contact using the set of combined confidence scores.

24 Claims, 4 Drawing Sheets

SYSTEM AND METHOD FOR EXTRACTING DEMOGRAPHIC INFORMATION

CROSS-REFERENCE TO RELATED OR CO-PENDING APPLICATIONS

This application relates to co-pending U.S. Patent Application PDNo. 200300184 Ser. No. 10/645,210, entitled "Selective Sampling For Sound Signal Classification," filed on Aug. 21, 2003, by Xiaofan Lin; U.S. Patent Application PDNo. 200309365 Ser. No. 10/699,264, entitled "System And Method For Call Center Dialog Management," filed on Oct. 30, 2003, by Sherif Yacoub; and U.S. Patent Application PDNo. 200309899 entitled "System And Method For Language Variation Guided Operator Selection," filed on Jan. 30, 2004, by Lin et al. These related applications are commonly assigned to Hewlett-Packard of Palo Alto, Calif.

BACKGROUND OF THE INVENTION

1. Field of the Invention

The present invention relates generally to systems and methods for call handling, and more particularly for extracting demographic information.

2. Discussion of Background Art

Automated call handling systems, such as Interactive Voice Response (IVR) systems, using Automatic Speech Recognition (ASR) and Text-to-speech (TTS) software are increasingly important tools for providing information and services to contacts in a more cost efficient manner. IVR systems are typically hosted by a server that includes an array of Digital Signal Processors (DSPs) and enable contacts to interact with corporate databases and services over a telephone using a combination of voice utterances and telephone button presses. IVR systems are particularly cost effective when a large number of contacts require data or services that are very similar in nature, such as banking account checking, ticket reservations, etc., and thus can be handled in an automated manner often providing a substantial cost savings due to a need for fewer human operators.

Knowledge of a contact's demographic characteristics within a call center however would be very valuable. Such demographic information enables IVR systems to make smarter decisions when providing information to contacts. For instance, advertisements are preferably targeted to a demographically well-defined group of people (e.g. young adults, woman under 50, or retired people). However, directly prompting contacts for such information is typically not desirable and so currently advertisements are not very demographically specialized. A contact's demographic information is also useful for tailoring the UVR system's responses to the contact's characteristics, such as avoiding fancy prompts with a tense contact or selecting the contact's gender as the synthetic voice generated by the IVR system. Similarly, the vocabulary and jargon used by the UVR system could also be adapted to the contact, and stressed callers (i.e. "contacts") could be considered when selecting an operator to handle the contact's call.

Accurately identifying a contact's demographic characteristic, however, is actually a very difficult problem. Many current systems for demographic classification use acoustic classifiers. Acoustic classifiers extract voice features from a contact's speech signal in an attempt to distinguish one or more of a contact's demographic characteristics, such as gender, age, accent, emotional state, etc. However, acoustic classifiers often have such a high error rate that many IVR systems will not deploy them. For instance, a company that repeatedly presents a demographically incorrect type of information to a contact, such as playing male-targeted ads for females, will reflect poorly on a contact's perception of that company.

In response to the concerns discussed above, what is needed is a system and method for extracting demographic information that overcomes the problems of the prior art.

SUMMARY OF THE INVENTION

The present invention is a system and method for extracting demographic information. The method of the present invention includes the elements of: initiating a dialog between a contact and a call handling system; selecting a set of demographic characteristics; assigning a set of acoustic confidence scores to the demographic characteristics; assigning a set of substantive confidence scores to the demographic characteristics; combining the acoustic and substantive confidence scores for each of the demographic characteristics; and tailoring information presented to the contact using the set of combined confidence scores.

The system of the present invention includes: an Interactive Voice Response (IVR) module for initiating a dialog between a contact and a call handling system, and selecting a set of demographic characteristics; an acoustic classifier for assigning a set of acoustic confidence scores to the demographic characteristics; a substantive classifier for assigning a set of substantive confidence scores to the demographic characteristics; and a data combiner for combining the acoustic and substantive confidence scores for each of the demographic characteristics; wherein the Interactive Voice Response module further tailors information presented to the contact using the set of combined confidence scores. The system also includes all means and embodiments for effecting the method.

These and other aspects of the invention will be recognized by those skilled in the art upon review of the detailed description, drawings, and claims set forth below.

DETAILED DESCRIPTION OF THE PREFERRED EMBODIMENT

The present invention provides multiple method combinations for extracting demographic information, such as information pertaining to the contact's gender, age, accent, smoker-nonsmoker status, mental tension or stress, being under the influence of psychotropic substances, etc. This information is gleaned from a contact's 102 utterances to a call handling system 104, such as a call center. The demographic information is then used to automatically adjust information presented to the contact 102. The methods for extracting demographic information include not only methods that operate on a speech signal level, but also methods that engage the contact 102 in a dialog. Reliance on more than one demographic extraction method provides a greater demographic accuracy that otherwise could be obtained from only one method by itself.

Figure 1:
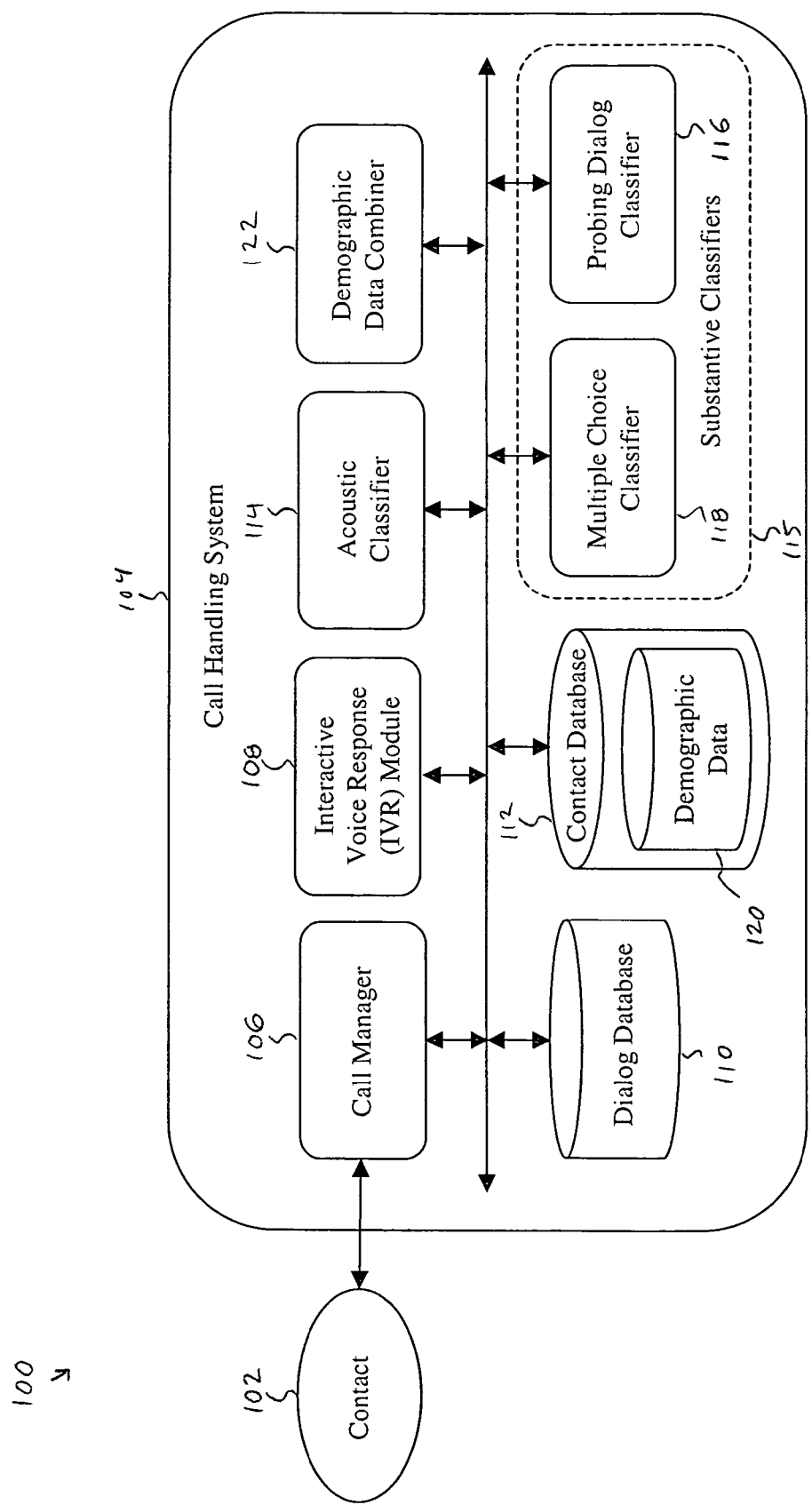
FIG. 1 is a dataflow diagram of one embodiment of a system for extracting demographic information.

FIG. 1 is a dataflow diagram of one embodiment of a system 100 for extracting demographic information. The call handling system 104 of the present invention preferably provides a voice interactive information management service to a set of contacts. Anticipated information services include those associated with customer response centers, enterprise help desks, business generation and marketing functions, competitive intelligence methods, as well as many others. Contacts may be customers, employees, or any party in need of the call handling system's services.

To begin, a dialog between the contact 102 and the call handling system 104 is initiated. The dialog begins once a call manager 106 connects the contact 104 to an Interactive Voice Response (IVR) module 108. The IR module 108 provides an automated interface between the contact's 104 speech signals received over a voice channel and the system's 100 overall functionality. To support such an interface with the contact 104, the IVR module 108 may include a Text-To-Speech (TTS) translator, Natural Language Processing (NLP) algorithms, Automated Speech Recognition (ASR), and various other dialog interpretation (e.g. a Voice-XML interpreter) tools.

The IVR module 108 retrieves and presents predetermined dialog segments from a dialog database 110 to the contact 102. The IVR module 108 receives responses and information requests back from the contact 102 which are then stored in a contact database 112.

Knowledge of the contact's 102 demographic information in many cases, however, enables the IVR module 108 to retrieve and present a more tailored set of dialog segments to the contact 102. Such tailored dialog segments typically enables the dialog to proceed more smoothly to the benefit of both the contact 102 and the call-handling system 104. Thus the IVR module 108 activates a set of demographic classifiers, including an acoustic classifier 114 and a set of substantive classifiers 115. The substantive classifiers 115 include a probing dialog classifier 116, and a multiple choice classifier 118. The substantive classifiers 115 are herein defined as a set of classifiers that use the dialog's words, sentences, context, and so on in order to identify the contact's 102 demographic characteristics. The substantive classifiers 115 can deduce various of the contact's 102 demographic characteristics from the dialog using various active methods such as question and answer exchanges with the contact. The substantive classifiers 115 can alternatively deduce such demographic characteristics by passively observing the information that the contact 102 requests and provides in the course of the dialog. In some cases, the results from the substantive classifiers 115 are not independent and so the results from substantive classifier can be fed into the other to improve classification accuracy.

These classifiers generate confidence scores indicating a probability that the contact 102 has a particular set of demographic characteristics. These confidence scores are continuous in nature, ranging from p=0.0 to p=1.0, and can be combined into an overall confidence score. These classifiers preferably do not output a binary yes-no output.

Acoustic Classifier

The call manager 106 diverts a copy of the contact's 102 speech utterances to the acoustic classifier 114 without interrupting the dialog between the contact 102 and the IVR module 108.

The acoustic classifier 114 extracts from the contact's 102 speech signal features relating to one or more demographic characteristics that need to be resolved with respect to the contact 102. Those skilled in the art recognize various speech signal features that are of use in identifying various demographic characteristics (i.e. pitch and cepstral features are useful in gender determination).

The acoustic classifier 114 compares the contact's 102 speech signal features to a predefined body of speech signal features generated using neural net techniques and assigns a set of confidence scores to each of the demographic characteristics. The acoustic classifier 114 stores the confidence scores in a demographic data 120 portion of the contact database 112.

An example of an acoustic classification is now discussed. For the purposes of this example, the contact's 102 gender is initially inferred just from the confidence scores assigned by the acoustic classifier 114. So if the contact 102 is a woman with a deep voice, the acoustic classifier's 114 confidence scores might indicate a high probability that the contact 102 is almost equally likely to be a female (p=0.9) or a male (p=0.8). However, if the contact 102 is a man with a deep voice, the acoustic classifier's 114 confidence scores might indicate a low probability that the contact 102 is a female (p=0.1), but a very high probability that the contact 102 is a male (p=0.999). Thus for the male with a deep voice, there is only a 0.1% chance of assigning gender incorrectly. However, for the female with a deep voice there is a 10% chance of assigning the gender incorrectly. In this latter case, the IVR module 108 would request additional help from the other classifiers 116 and 118 to resolve the contact's 102 gender.

Probing Dialog Classifier

A probing dialog classifier 116 presents the contact 102 with one or more probing dialogs retrieved from the dialog database 110. The probing dialogs ask a set of questions related to one or more demographic characteristics that need to be resolved with respect to the contact 102. The probing dialog classifier 116 compares the contact's 102 responses to a predefined body of responses generated using neural net techniques, however, other pattern recognition classifiers are also possible. Then the probing dialog classifier 116 assigns a set of confidence scores to each of the demographic characteristics. The probing dialog classifier 116 stores the confidence scores in the demographic data 120 portion of the contact database 112.

An example of a probing dialog is shown below. In this example, the IVR module 108 needs to know the contact's 102 gender before responding to the contact's movie theater inquiry. For the purposes of this example, the contact's 102 demographic characteristics are inferred just from the confidence scores assigned by the probing dialog classifier 116.

IVR module: Please hold while we retrieve information about movies in the theater you selected.

("Probing Dialog" Starts Here)

IVR module: While holding, are you interested in receiving promotions on "cosmetics"?

Contact: No

IVR module: Would you be interested in some current promotions on "workshop tools"?

Contact: Yes ("Probing Dialog" Ends Here)

(Demographically Tailored Advertisement Starts Here)

IVR module: "Store A" is offering a sale this weekend on a toolbox that runs for 29.99. The toolbox contains . . . .

IVR module: Thank you for holding. We found the following movies for you.

(Demographically Tailored Movie List Starts Here)
IVR module: Darkness Falls (horror)
IVR module: Red Dragon (Violence)
IVR module: How to Lose a Guy in 10 Days (Romance)

Since the contact 102 indicated a lack of interest in cosmetics but an interest in workshop tools, the probing dialog classifier 116 assigns the contact's 102 male gender confidence score to a value greater than that assigned to the contact's 102 female gender confidence score. Since the contact's 102 male confidence score is higher, the IVR module 108 presents the contact 102 an advertisement and orders the list of movies in way likely to be preferred by a male (i.e. a tool advertisement and a list of movies where horror and violence titles come before romance). If however, the contact's 102 female confidence score was higher, the IVR module 108 would present the contact 102 an advertisement and order the list of movies in way likely to be preferred by a female (i.e. a cosmetic advertisement and a list of movies where romance titles come before horror and violence titles).

Multiple Choice Classifier

A multiple choice classifier 118 presents the contact 102 with one or more multiple choice questions retrieved from the dialog database 110. The multiple choice questions present a selection of choices related to one or more demographic characteristics that need to be resolved with respect to the contact 102. The multiple choice classifier 118 compares the contact's 102 responses to a predefined body of responses generated using neural net techniques and assigns a set of confidence scores to each of the demographic characteristics. The multiple choice classifier 118 stores the confidence scores in the demographic data 120 portion of the contact database 112.

The multiple choice classifier 118 is likely to be quicker than the probing dialog classifier 116, since a single multiple choice question can replace several yes-no probing dialog questions. In alternate embodiments of the present invention multiple choice questions can be hierarchically ordered, which is relevant to, for example, binary classification trees.

An example of a multiple choice dialog is shown below. In this example like the one above, the IVR module 108 needs to know the contact's 102 gender before responding to the contact's movie theater inquiry. For the purposes of this example, the contact's 102 demographic characteristics are inferred from the confidence scores assigned by the multiple choice classifier 118 only.

IVR module: Please hold while we retrieve information about movies in the theater you selected.
(Advertising related "Multiple choice questions" Start Here)
IVR module: While holding we will provide you with some existing promotions in your neighborhood.
IVR module: Please select which promotions will be of main interest to you. If you are interested in "Cosmetics" please say "Cosmetics". If you are interested in workshop tools, please say "tools".
Contact: Cosmetics
IVR module: Please choose from the following: a) lipsticks, b) eyeliner, c) foundation. Or say exit if you feel you have reached a wrong menu.
Contact: eyeliner
("Multiple choice questions" End Here)
(Demographically Tailored Advertisement Starts Here)
IVR module: . . . promotions . . .
(Demographically Tailored Movie List Starts Here)
IVR module: Thank you for holding. We found the following movies for you.
IVR module: How to Lose a Guy in 10 Days (Romance)
IVR module: Darkness Falls (horror)
IVR module: Red Dragon (Violence)

Since the contact 102 indicated an interest in cosmetics and eyeliner, the multiple choice classifier 118 assigns the contact's 102 female gender confidence score a value greater than that assigned to the contact's 102 male gender confidence score. Also, since the contact's 102 female confidence score is higher, the IVR module 108 orders the list of movies in way likely to be preferred by a female (i.e. listing romance titles before horror and violence titles). If however, the contact 102 had selected "Exit," the multiple choice classifier 118 will lower the contact's 102 female gender confidence score.

Note that experimental testing suggested that the gender questions presented in the example dialog above provide for strong gender prediction.

While the acoustic classifier 114 preferably runs continuously in the background as the dialog between the contact 102 and the IVR module 108 is occurring, the probing dialog classifier 116 and the multiple choice classifier 118 are preferably not called unless the IVR module 108 needs the contact's demographic data and the acoustic classifier's 114 demographic characteristic confidence scores are less than definitive, such as if the acoustic classifier 114 sets the contact's 102 female gender confidence score to $p=0.45$ and the contact's 102 male gender confidence score to $p=0.55$.

In an alternate embodiment, the probing dialog classifier 116 and the multiple choice classifier 118 operate in parallel with the acoustic classifier 114 and the dialog, so that when the IVR module 108 needs the contact's demographic data, the confidence scores of each of the classifiers 114, 116, and 118 can be combined to yield a more accurate demographic confidence score.

Preferably, the probing dialogs and multiple choice questions are presented to the contact 102 during those periods when the contact 102 is not interacting heavily with the IVR module 108, such as when the contact 102 would otherwise be placed on "hold".

Demographic characteristics stored by the various classifiers 114, 116, and 118 in the demographic data 120 portion of the contact database 112 are preferably synchronized to ensure that the confidence scores from each of the different classifiers 114, 116, and 118 refer to the same contact (or call instance).

Demographic Data Combiner

A demographic data combiner 122 retrieves the confidence scores stored in the demographic data 120 for the various demographic characteristics. The combiner 122 calculates a combined confidence score for each of the demographic characteristics. The combined confidence score can be calculated in several different ways depending upon how statistically independent the different classifiers are 114, 116, and 118 and the demographic characteristic being identified.

One calculation method uses an equal-weighted product combination. The equal weighted method equally weights and multiplies together the confidence scores from each classifier 114, 116, and 118 to yield the combined confidence score.

Another calculation method is the weighted linear summation, according to the following formula:

$$S(C_i) = \sum_{j=1}^{N} r_j p_{ij}$$

(N is the number of classifiers, Ci is the i'th class, Pij is the probability of belonging to Ci as decided by Classifier j, and $r_j$ is trained weights)

A third calculation method is the weighted exponential, according to the following formula:

$$S(C_i) = \prod_{j=1}^{N} p_{ij}^{r_j}$$

A third calculation method uses a neural net, such as Multiple Layer Perception (MLP) network, with $\{p_{i1}, p_{i2}, \ldots, p_{iN}\}$ as the input.

The combiner 122 dynamically adjusts each classifier's 114, 116, and 118 weight using ground truth data. The ground truth data may include product, service, or error-cost criteria, such as: a purchase value of a product or service being presented to the contact 102 by the call handling system 104; the degree to which various demographic audiences would understand the jargon used in presenting the product or service; the costs of misidentifying the contact's 102 demographic information; and how much the contact 102 might spend on the product or service.

The combiner 122 also dynamically adjusts a first classifier's 114, 116, or 118 weight for a given demographic characteristic if the first classifier's confidence score differs from a second classifier's 114, 116, or 118 confidence score for that given demographic characteristic by a predetermined amount. For example, if the contact 102 turns out to be female, and the acoustic classifier 114 identified the contact 102 as male, but the probing dialog classifier 116 and the multiple choice classifier 118 identified the contact 102 as female, then with respect to the gender demographic, the combiner 122 would reduce the acoustic classifier's 114 weighting and increase the weightings for the probing dialog classifier 116 and the multiple choice classifier 118. Classifier weighting can be varied in a number of ways, including by 1/M % where M is a total number of contact dialogs to date.

One exemplary embodiment of how the demographic data combiner 122 combines the confidence scores generated by the classifiers 114, 116, and 118 using the equal-weighted product combination method is shown in the table below. Note in this example the classifiers 114, 116, and 118 are assumed to be independent since they use different techniques for identifying the gender demographic.

If the classifiers 14, 116, and 118 have different weightings, the combined confidence score in the last column of the table is altered according to the following formula: $\Pi_i p_i^{K_i}$, where $p_i$ is the p-value for each classifer i, and $K_i$ is the corresponding power of the classifier, which is dynamically updated. Those skilled in the art however will recognize that alternative methods to the power-based one presented are also possible.

From the table, the male demographic characteristic has a highest combined confidence score. Note that reliance on only the acoustic classifier 114 would have yielded an opposite gender determination. A "percent maleness" of the contact 102 is calculated according to the following equation: "percent maleness"=((0.140)/(0.030+0.140))× 100%=82.35%.

The IVR module 108 instructs one or more of the classifiers 114, 116, and 118 to continue classification of the contact's 102 demographic characteristics until either a predetermined set of demographic characteristics have either individually or combined confidence scores that are above a predetermined threshold or until a predetermined time period has expired. For example, the IVR module 108 may instruct the multiple choice classifier 118 to continue asking the contact multiple choice questions until either the female or the male gender confidence score reaches at least p=0.80 or until the contact 102 has been asked questions for 5 minutes.

The combiner 122 stores the combined confidence score for each of the demographic characteristics in the demographic data 120. The IVR module 108 retrieves the combined confidence score from the demographic data 120.

The IVR module 108 tailors information presented to the contact 102 using the combined confidence scores. More specifically, the IVR module 108 identifies a sub-set of the demographic characteristics having combined confidence scores exceeding a predetermined set of thresholds. Preferably, the set of thresholds corresponds to those demographic characteristics having a highest combined confidence score within each demographic characteristic category. For instance, if the demographic characteristics required for the contact 102 included gender (i.e. male or female) and a stress level (i.e. low stress or high stress) and if the combined confidence scores were respectively, p=0.7 male, p=0.2 female, p=0.4 low stress, and p=0.3 high stress, then the sub-set of demographic characteristics identified by the IVR module 108 for the contact 102 would be, male and low stress. The IVR module 108 then presents the contact 102 with information specifically directed to contacts having the sub-set of demographic characteristics (i.e. male and low stress).

In another example, the IVR module 108 can use the combined confidence score to make a determination between presenting the contact 102 with a set of man-specific content, a set of women-specific content, or a set of gender-neutral content. Gender-neutral content could be

| Set of Demographic Characteristics | Acoustic Classifier Score | Probing Dialog Classifier Score | Multiple Choice Classifier Score | Demographic Data Combiner Classification Score |
|---|---|---|---|---|
| Male | 0.4 | 0.7 | 0.5 | 0.4 × 0.7 × 0.5 = 0.140 |
| Female | 0.5 | 0.2 | 0.3 | 0.4 × 0.2 × 0.4 = 0.030 |
| Don't Know | 0.1 | 0.1 | 0.2 | 0.1 × 0.1 × 0.2 = 0.002 | played to a contact whose combined confidence score are still less than definitive, but gender specific information could be played to contacts whose combined confidence scores are above a predetermined threshold.

Thus using the combined confidence scores, the IVR module presents to the contact 102 a dialog portion that is more demographically tailored to the contact 102. Such tailoring thereby enables the IVR module 108 to make a more appropriate set of decisions during the dialog with the contact 102, including selecting and presenting: advertisements, music, jokes, and so on.

Figure 2:
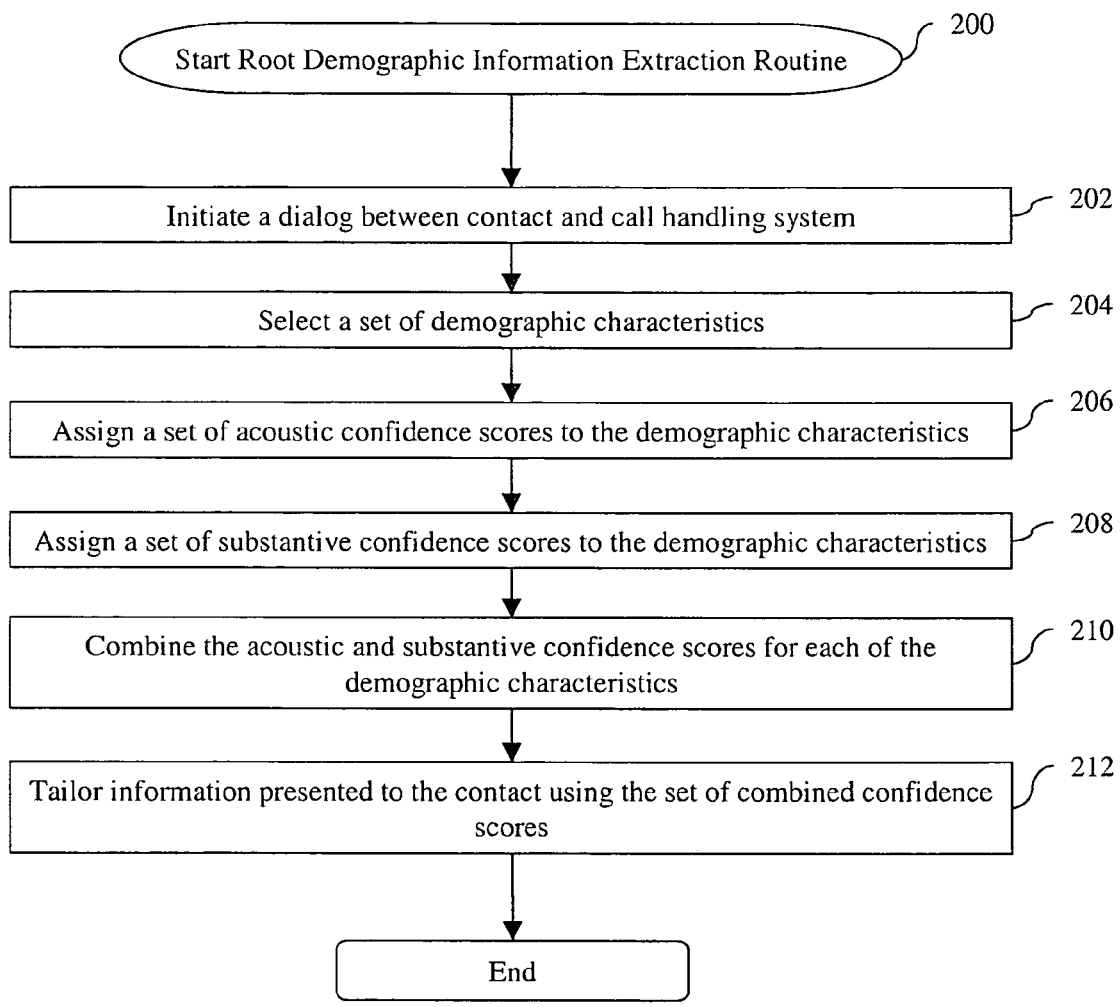
FIG. 2 is a flowchart of one embodiment of a root method for extracting demographic information.

FIG. 2 is a flowchart of one embodiment of a root method 200 for extracting demographic information. In step 202, initiate a dialog between a contact and a call handling system. In step 204, select a set of demographic characteristics. In step 206, assign a set of acoustic confidence scores to the demographic characteristics. In step 208, assign a set of substantive confidence scores to the demographic characteristics. In step 210, combine the acoustic and substantive confidence scores for each of the demographic characteristics. Then in step 212, tailor information presented to the contact using the set of combined confidence scores. Details of the root embodiment just presented are now discussed with respect to FIGS. 3A and 3B.

Figure 3A:
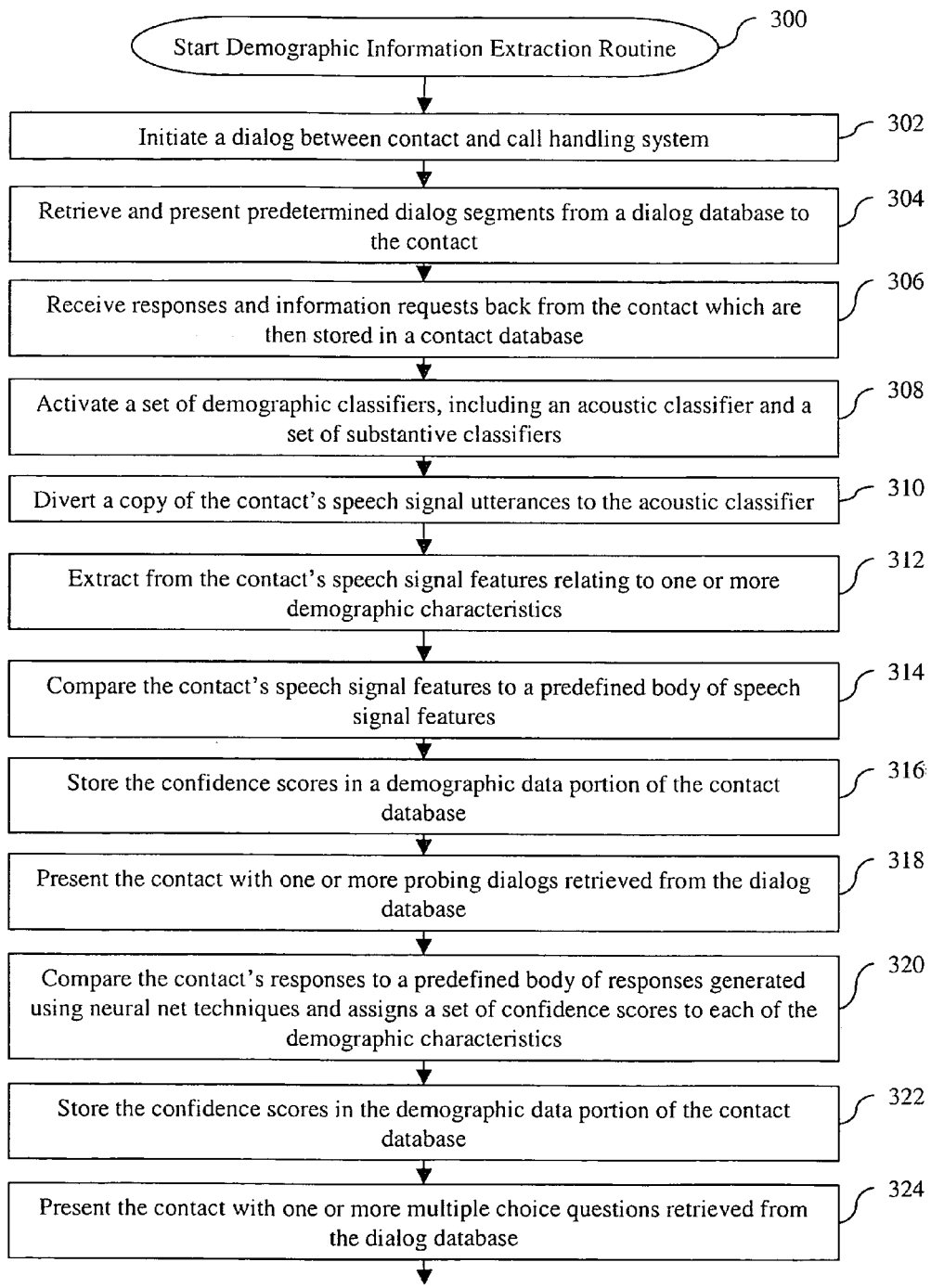
FIGS. 3A and 3B are a flowchart of one expanded embodiment of the root method for extracting demographic information.
Figure 3B:
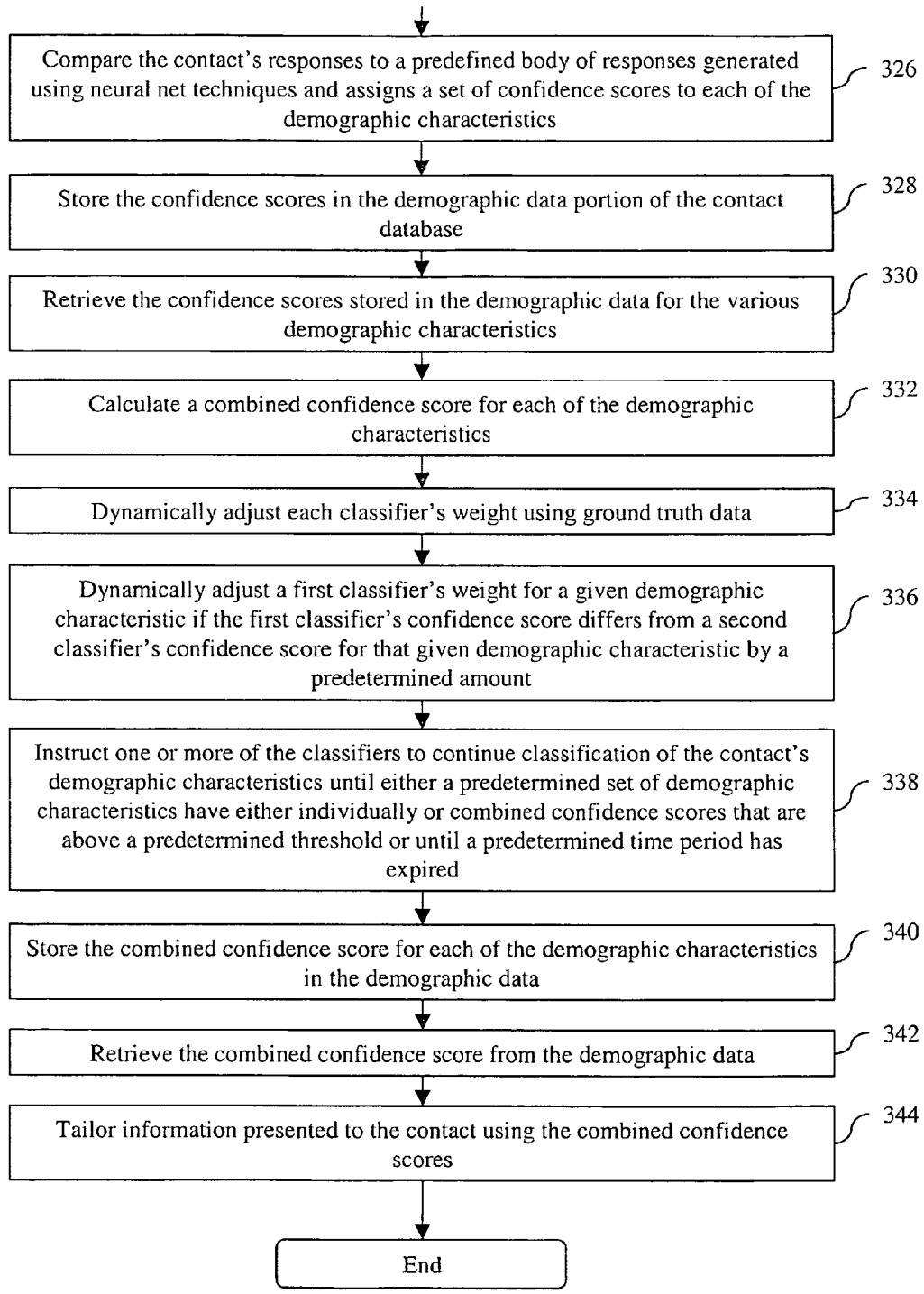

FIGS. 3A and 3B are a flowchart of one expanded embodiment 300 of the root method for extracting demographic information. To begin, in step 302, a dialog between the contact 102 and the call handling system 104 is initiated. In step 304, the IVR module 108 retrieves and presents predetermined dialog segments from a dialog database 110 to the contact 102. In step 306, the IVR module 108 receives responses and information requests back from the contact 102 which are then stored in a contact database 112. In step 308, the IVR module 108 activates a set of demographic classifiers, including an acoustic classifier 114 and a set of substantive classifiers 115.

Acoustic Classifier

In step 310, the call manager 106 diverts a copy of the contact's 102 speech signal utterances to the acoustic classifier 114 without interrupting the dialog between the contact 102 and the IVR module 108. In step 312, the acoustic classifier 114 extracts from the contact's 102 speech signal features relating to one or more demographic characteristics that need to be resolved with respect to the contact 102.

In step 314, the acoustic classifier 114 compares the contact's 102 speech signal features to a predefined body of speech signal features generated using neural net techniques and assigns a set of confidence scores to each of the demographic characteristics. In step 316, the acoustic classifier 114 stores the confidence scores in a demographic data 120 portion of the contact database 112.

Probing Dialog Classifier

In step 318, a probing dialog classifier 116 presents the contact 102 with one or more probing dialogs retrieved from the dialog database 110. In step 320, the probing dialog classifier 116 compares the contact's 102 responses to a predefined body of responses generated using neural net techniques and assigns a set of confidence scores to each of the demographic characteristics. In step 322, the probing dialog classifier 116 stores the confidence scores in the demographic data 120 portion of the contact database 112.

Multiple Choice Classifier

In step 324, a multiple choice classifier 118 presents the contact 102 with one or more multiple choice questions retrieved from the dialog database 110. In step 326, the multiple choice classifier 118 compares the contact's 102 responses to a predefined body of responses generated using neural net techniques and assigns a set of confidence scores to each of the demographic characteristics. In step 328, the multiple choice classifier 118 stores the confidence scores in the demographic data 120 portion of the contact database 112.

Demographic Data Combiner

In step 330, a demographic data combiner 122 retrieves the confidence scores stored in the demographic data 120 for the various demographic characteristics. In step 332, the combiner 122 calculates a combined confidence score for each of the demographic characteristics.

In step 334, the combiner 122 dynamically adjusts each classifier's (114, 116, and 118) weight using ground truth data. In step 336, the combiner 122 also dynamically adjusts a first classifier's (114, 116, or 118) weight for a given demographic characteristic if the first classifier's confidence score differs from a second classifier's (114, 116, or 118) confidence score for that given demographic characteristic by a predetermined amount.

In step 338, the IVR module 108 instructs one or more of the classifiers 114, 116, and 118 to continue classification of the contact's 102 demographic characteristics until either a predetermined set of demographic characteristics have either individually or combined confidence scores that are above a predetermined threshold or until a predetermined time period has expired. In step 340, the combiner 122 stores the combined confidence score for each of the demographic characteristics in the demographic data 120.

In step 342, the IVR module 108 retrieves the combined confidence score from the demographic data 120. In step 344, the IVR module 108 tailors information presented to the contact 102 using the combined confidence scores.

While one or more embodiments of the present invention have been described, those skilled in the art will recognize that various modifications may be made. Variations upon and modifications to these embodiments are provided by the present invention, which is limited only by the following claims.

What is claimed is:

1. A method for extracting demographic information, comprising:
    initiating a dialog between a contact and a call handling system;
    selecting a set of demographic characteristics;
    assigning a set of acoustic confidence scores to the demographic characteristics;
    assigning a set of substantive confidence scores to the demographic characteristics, wherein assigning substantive confidence scores includes:
        presenting the contact with a set of multiple choice questions associated with the demographic characteristics;
        collecting a set of responses to the multiple choice questions from the contact, wherein the set of responses includes a choice that the contact selected from the multiple choices;
        comparing the contact's responses to a predefined body of multiple choice question responses associated with the set of demographic characteristics; and
        assigning a set of multiple choice confidence scores to the demographic characteristics based on the comparison;
    combining the acoustic, multiple choice, and substantive confidence scores for each of the demographic characteristics using at least one of a weighted linear summation and a weighted exponential; and
tailoring information presented to the contact using the set of combined confidence scores.

2. The method of claim 1, wherein assigning substantive confidence scores includes:
presenting the contact with a first substantive dialog;
collecting a set of responses to the first substantive dialog from the contact;
comparing the contact's responses to a predefined body of responses associated with the set of demographic characteristics; and
assigning a first set of substantive confidence scores to the demographic characteristics.

3. The method of claim 2, wherein presenting includes:
continuing to present the contact with the substantive dialog until one of the substantive dialog confidence score reaches a predetermined value.

4. The method of claim 2, wherein presenting includes:
continuing to present the contact with the substantive dialog until a predetermined time period has expired.

5. The method of claim 2, wherein presenting includes:
presenting the substantive dialog to the contact when the contact is placed on hold.

6. The method of claim 2, wherein assigning substantive confidence scores includes:
presenting the contact with a second substantive dialog, in response to a request from the call handling system;
collecting a set of responses to the second substantive dialog from the contact;
comparing the contact's responses to the predefined body of responses
associated with the set of demographic characteristics; and
assigning a second set of substantive confidence scores to the demographic characteristics.

7. The method of claim 1, wherein assigning substantive confidence scores includes;
presenting the contact with a probing dialog;
collecting a set of responses to the probing dialog from the contact;
comparing the contact's responses to a predefined body of probing dialog responses associated with the set of demographic characteristics; and
assigning a set of probing dialog confidence scores to the demographic characteristics.

8. The method of claim 7, wherein presenting includes;
asking the contact a set of questions associated with the demographic characteristics.

9. The method of claim 1, wherein assigning acoustic confidence scores includes:
extracting an acoustic feature from the contact's speech signal; and
comparing the feature to a predefined body of speech signal features associated with the set of demographic characteristics.

10. The method of claim 1, wherein combining includes:
weighting the confidence scores using ground truth data.

11. The method of claim 1, wherein weighting includes:
adjusting a first confidence scores weight for a given demographic characteristic if the first confidence score differs from a second confidence score for that given demographic characteristic by a predetermined amount.

12. The method of claim 1, wherein combining includes:
multiplying together the confidence scores for each demographic characteristic.

13. The method of claim 1, wherein combining includes:
combining the confidence scores for each demographic characteristic according to the following formula:

$$S(C_i) = \sum_{j=1}^{N} r_j p_{ij}$$

(where N is a Loud number of classifiers, Ci is the i'th demographic characteristic, and Pij is a confidence score for Ci generated by Classifier j, and $r_j$ is trained weights).

14. The method of claim 1, wherein combining includes:
combining the confidence scores from each classifier for each demographic characteristic according to the following formula:

$$S(C_i) = \prod_{j=1}^{N} p_{ij}^{r_j}$$

(where N is a total number of classifiers, Ci is the i'th demographic characteristic, and Pij is a confidence score for Ci generated by Classifier j, and $r_j$ is trained weights).

15. The method of claim 1, wherein combining includes:
using a neural net to combine the confidence scores for each demographic characteristic.

16. The method of claim 15, wherein the neural net is a Multiple Layer Perception (MLP) network.

17. The method of claim 1, wherein tailoring includes:
identifying a sub-set of the demographic characteristics having combined confidence scores exceeding a predetermined set of thresholds; and
presenting the contact with information specifically directed to contacts having the sub-set of demographic characteristics.

18. The method of claim 17, wherein the predetermined threshold is equal to a highest combined confidence score.

19. The method of claim 1, wherein the demographic characteristics include gender, age, accent, and stress level.

20. A method for extracting demographic information, comprising:
initiating a dialog between a contact and a call handling system;
selecting a set of demographic characteristics;
assigning a set of acoustic confidence scores to the demographic characteristics;
assigning a set of substantive confidence scores to the demographic characteristics;
combining the acoustic and substantive confidence scores for each of the demographic characteristics using at least one of a weighted linear summation and a weighted exponential;
tailoring information presented to the contact using the set of combined confidence scores;
presenting the contact with a probing dialog;
collecting a set of responses to the probing dialog from the contact;
comparing the contact's responses to a predefined body of probing dialog responses associated with the set of demographic characteristics;
assigning a set of probing dialog confidence scores to the demographic characteristics;

presenting the contact with a set of multiple choice questions;

collecting a set of responses to the multiple choice questions from the contact, wherein the set of responses to the multiple choice questions includes a choice that the contact selected from the multiple choices;

comparing the contact's responses to a predefined body of multiple choice question responses associated with the set of demographic characteristics; and assigning a set of multiple choice confidence scores to the demographic characteristics.

21. A computer-readable medium embodying computer program code for commanding a computer to extract demographic information, comprising;

initiating a dialog between a contact and a call handling system;

selecting a set of demographic characteristics;

assigning a set of acoustic confidence scores to the demographic characteristics; assigning a set of substantive confidence scores to the demographic characteristics, wherein assigning the set of substantive confidence scores includes:

presenting the contact with a set of multiple choice questions associated with the demographic characteristics;

collecting a set of responses to the multiple choice questions from the contact, wherein the set of responses includes a choice that the contact selected from the multiple choices;

comparing the contact's responses to a predefined body of multiple choice question responses associated with the set of demographic characteristics; and assigning a set of multiple choice confidence scores to the demographic characteristics based on the comparison;

combining the acoustic, multiple choice, and substantive confidence scores for each of the demographic characteristics using at least one of a weighted linear summation and a weighted exponential; and tailoring information presented to the contact using the set of combined confidence scores.

22. A system for extracting demographic information, comprising a:

means for initiating a dialog between a contact and a call handling system; means for selecting a set of demographic characteristics;

means for assigning a set of acoustic confidence scores to the demographic characteristics;

means for assigning a set of substantive confidence scores to the demographic characteristics, wherein assigning a set of substantive confidence scores includes:

presenting the contact with a set of multiple choice questions associated with the demographic characteristics;

collecting a set of responses to the multiple choice questions from the contact, wherein the set of responses includes a choice that the contact selected from the multiple choices;

comparing the contact's responses to a predefined body of multiple choice question responses associated with the set of demographic characteristics; and assigning a set of multiple choice confidence scores to the demographic characteristics based on the comparison;

means for combining the acoustic, multiple choice, and substantive confidence scores for each of the demographic characteristics using at least one a weighted linear summation and a weighted exponential; and means for tailoring information presented to the contact using the set of combined confidence scores.

23. A system for extracting demographic information, comprising:

an Interactive Voice Response module for initiating a dialog between a contact and a call handling system, and selecting a set of demographic characteristics;

an acoustic classifier for assigning a set of acoustic confidence scores to the demographic characteristics;

a substantive classifier for assigning a set of substantive confidence scores to the demographic characteristics; and a data combiner for combining the acoustic and substantive confidence scores for each of the demographic characteristics using at least one of a weighted linear summation and a weighted exponential;

a multiple choice classifier for assigning a set of multiple choice confidence scores to the demographic characteristics, wherein assigning the set of multiple choice confidence scores includes:

presenting the contact with a set of multiple choice questions associated with the demographic characteristics;

collecting a set of responses to the multiple choice questions from the contact, wherein the set of responses includes a choice that the contact selected from the multiple choices;

comparing the contact's responses to a predefined body of multiple choice question responses associated with the set of demographic characteristics; and wherein the Interactive Voice Response module further tailors information presented to the contact using the set of combined confidence scores.

24. The system of claim 23, wherein the substantive classifier includes:

a probing dialog classifier for assigning a set or probing dialog confidence scores to the demographic characteristics.

* * * * *

UNITED STATES PATENT AND TRADEMARK OFFICE
CERTIFICATE OF CORRECTION

PATENT NO. : 7,349,527 B2 Page 1 of 1
APPLICATION NO. : 10/769137
DATED : March 25, 2008
INVENTOR(S) : Sherif Yacoub et al.

It is certified that error appears in the above-identified patent and that said Letters Patent is hereby corrected as shown below:

In column 1, line 51, delete "UVR" and insert -- IVR --, therefor.

In column 1, line 55, delete "UVR" and insert -- IVR --, therefor.

In column 3, line 14, delete "IR" and insert -- IVR --, therefor.

In column 11, line 38, in Claim 7, after "includes" delete ";" and insert -- : --, therefor.

In column 11, line 47, in Claim 8, after "includes" delete ";" and insert -- : --, therefor.

In column 12, line 10, in Claim 13, delete "Loud" and insert -- total --, therefor.

In column 13, line 14, in Claim 21, after "comprising" delete ";" and insert -- : --, therefor.

In column 14, line 13, in Claim 22, after "one" insert -- of --.

In column 14, line 50, in Claim 24, after "a set" delete "or" and insert. -- of --, therefor.

Signed and Sealed this

Twenty-third Day of June, 2009

JOHN DOLL
*Acting Director of the United States Patent and Trademark Office*